United States Patent [19]

Smallacombe

[11] Patent Number: 4,893,682

[45] Date of Patent: Jan. 16, 1990

[54] ROTATING FLEXIBLE IMPLEMENT FOR SOIL EROSION CONTROL

[76] Inventor: Bruce W. Smallacombe, Capella, Queensland, 4702, Australia

[21] Appl. No.: 277,974

[22] Filed: Nov. 30, 1988

Related U.S. Application Data

[63] Continuation-in-part of Ser. No. 44,193, Apr. 30, 1987, abandoned.

[30] Foreign Application Priority Data

Jun. 10, 1986 [AU] Australia .................. PH6318

[51] Int. Cl.$^4$ ............... A01B 29/06; A01B 35/16
[52] U.S. Cl. ........................ 172/311; 172/518; 172/612; 172/478
[58] Field of Search ............... 172/311, 612, 189, 518, 172/540, 143, 262, 261, 44, 310, 528, 698

[56] References Cited

U.S. PATENT DOCUMENTS

| | | | |
|---|---|---|---|
| 1,314,292 | 8/1919 | Wallesverd | 172/189 |
| 2,825,983 | 3/1958 | Finn | 172/612 |
| 3,333,645 | 8/1967 | Gustafson | 172/311 |
| 3,515,219 | 6/1970 | Jackson | 172/44 |
| 3,548,954 | 12/1970 | Lindemann | 172/311 |

FOREIGN PATENT DOCUMENTS

| | | | |
|---|---|---|---|
| 624302 | 7/1961 | Canada | 172/540 |
| 745395 | 7/1980 | U.S.S.R. | 172/612 |
| 971127 | 11/1982 | U.S.S.R. | 172/612 |
| 48312 | 12/1983 | U.S.S.R. | 172/189 |

Primary Examiner—Richard J. Johnson
Attorney, Agent, or Firm—Kimmel, Crowell & Weaver

[57] ABSTRACT

An agricultural implement having a mobile mounting frame for moving across an area to be treated, and a soil working assembly co-operating with the mounting frame. The soil working assembly includes a flexible chain of interconnected links, the chain being rotatable about its axis and having blades extending from the chain. The blades are adapted to penetrate gravitationally, scoop hollows from, the soil as the implement is advanced rotating the chain over the soil. The implement reduces undesirable consequences of rapid and unimpeded run-off of rain water by upturning the soil in such a manner that run-off is impeded.

8 Claims, 4 Drawing Sheets

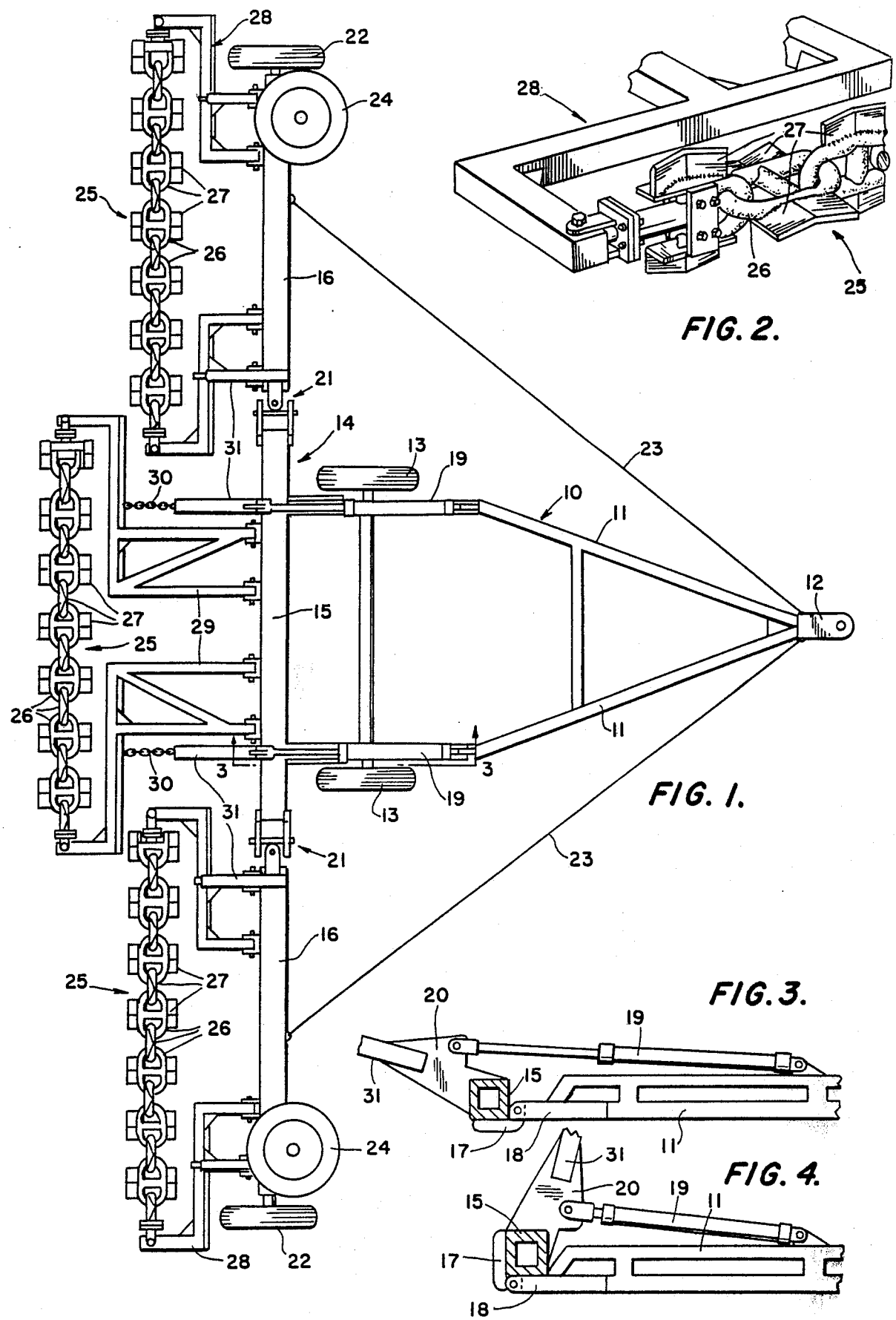

ROTATING FLEXIBLE IMPLEMENT FOR SOIL EROSION CONTROL

This application is a continuation-in-part of application Ser. No. 044,193 filed Apr. 30, 1987 abandoned.

BACKGROUND OF THE INVENTION (1) Field of the Invention

THIS INVENTION relates to an agricultural implement for soil erosion control.

(2) Prior Art

Erosion of soil from cultivated land often occurs as a consequence of rapid and unimpeded run-off of rain water.

The present invention has been devised with the general object of greatly reducing this without undue disturbance or up-turning of the soil which makes the land difficult to drive across. Another object achievable in preferred forms of the invention is to provide such an implement which is capable of operation over land which has been mulched with trash, and which will assist in penetration of the soil by the trash.

SUMMARY OF THE PRESENT INVENTION

According to the invention, an agricultural implement for soil erosion control has a wheel-mounting frame connected to the rear of a drawbar, by means of which the implement may be towed across ground to be treated to reduce run-off of rain water. Carrier means connect to the mounting frame at least one soil working assembly, consisting of a chain of interconnected links, rotatable about its axis, blades extending from links of the chain transversely to the direction of travel, the blades being adapted, as the implement is advanced and the chain is rotated, to penetrate the soil and scoop hollows from it. Preferably the mounting frame includes a central section, which is hinged about a transverse axis to the rear of the drawbar, and which is flanked by hingedly connected wing frames, each of the central section and wing frames carrying one of the soil working assemblies, that of the central section being behind and between those of the wing frames, to form an unbroken working front, means being provided for lifting the mounting frame from a horizontal working position to an upright travelling position at which the wing frames may be swung hingedly forward over the drawbar.

BRIEF DESCRIPTION OF THE DRAWINGS

In the drawings:

FIG. 1 is a plan view of an implement of a first embodiment according to the invention;

FIG. 2 is a detailed perspective view of part of a soil working assembly of the implement;

FIG. 3 is a section view along line 3—3 in FIG. 1, and to larger scale;

FIG. 4 is a similar view to FIG. 3 but with the implement beam pivoted from its operative to its raised inoperative position;

Referring to FIGS. 1 to 8, the implement illustrated includes a drawbar frame 10 with its side members 11 rearwardly divergent from a front hitch 12 for connection to a tractor, tractor-drawn chisel plough or other implement (not shown), the rear parts of the side members 11 being parallel. Near to its rear the drawbar frame is supported by a pair of wheels 13.

Figure 5:
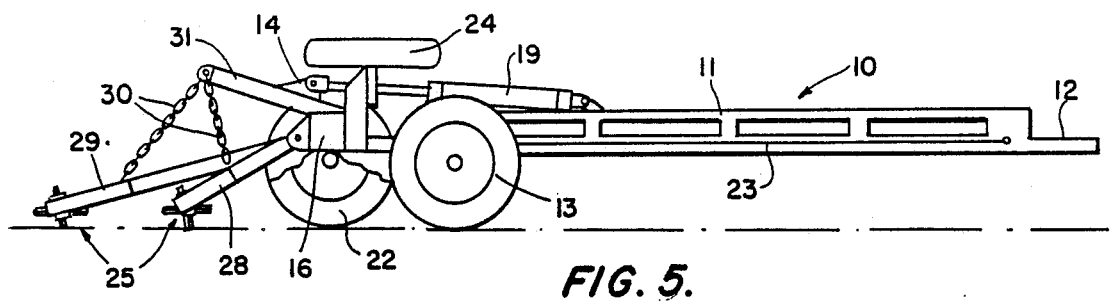
FIG. 5 is a partly broken-away side elevational view of the implement in its working arrangement.

A transverse box-section beam 14 comprises a mid-section 15 and a pair of wing sections 16. The beam mid-section is pivoted to the rear ends of the drawbar frame side members, lugs 17 on the beam section being pivoted between pairs of lugs 18 extending rearwards from the sides of the drawbar frame. A pair of double-acting hydraulic rams 19 are connected between the sides of the drawbar frame 10 and a pair of ram lugs 20 on the beam mid-section. When the rams are extended, the beam 14, as shown in FIG. 3, is in its working position, and when the rams are retracted, as shown in FIG. 4, the beam mid-section is turned through a right angle, and raised, to come to rest on the lugs 18.

Figure 6:
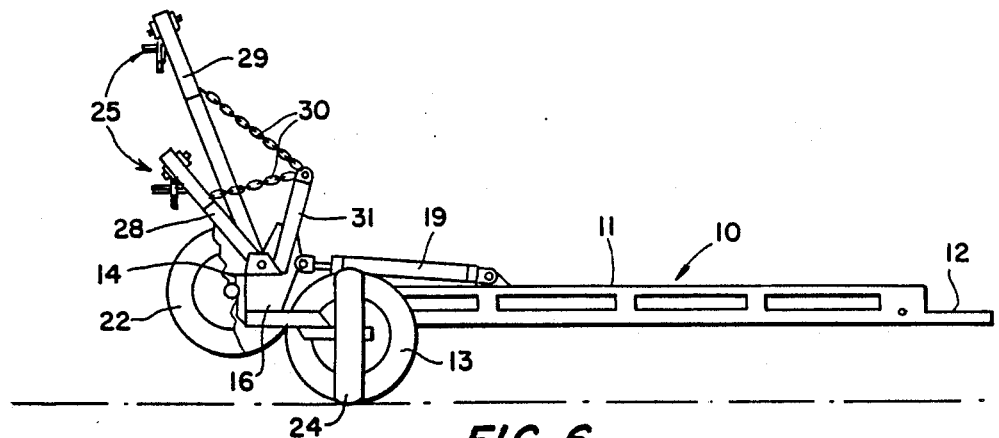
FIG. 6 is a partly broken-away side elevational view of the implement with its beam pivoted as shown in detail in FIG. 4, and its soil working assemblies lifted clear of the ground.
Figure 7:
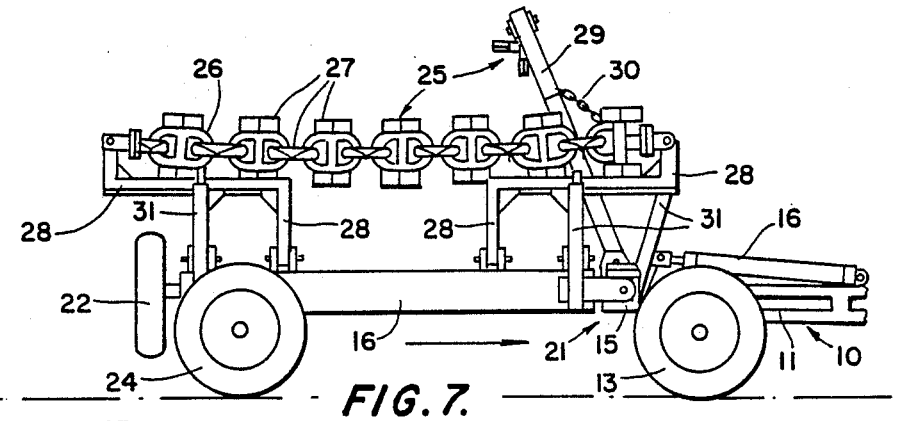
FIG. 7 is a partly broken-away side elevational view of the implement in its travelling arrangement.
Figure 8:
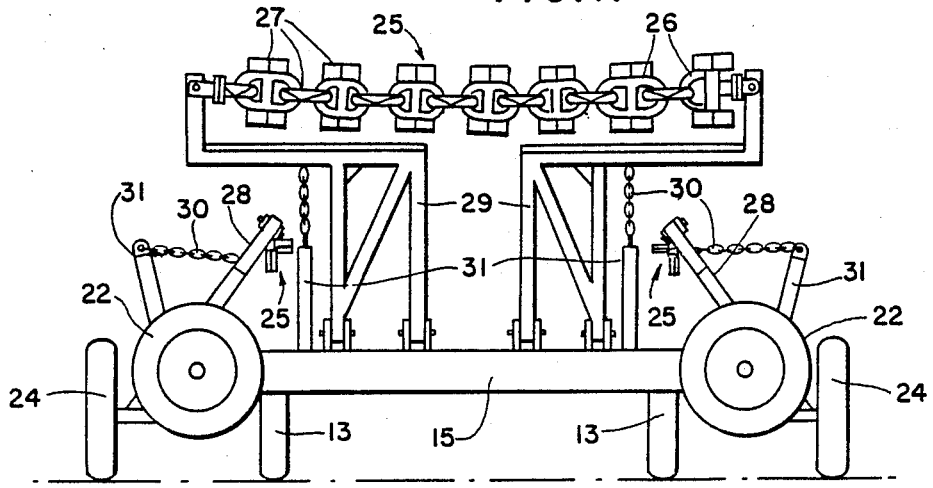
FIG. 8 is a rear elevational view of the implement as shown in FIG. 7.

Each wing section 16 of the beam 14 is connected to an end of the mid-section 15 by a universal joint at 21, and the distal end of the wing section is supported, when the beam is in its working position, by a wheel 22, its axis parallel to the wing section. Cables 23, fixed to opposite sides of the front part of the drawbar frame 10 and detachably connected to the outer parts of the beam wing sections 16, normally maintain the three sections of the beam 14 in alignment. When the rams 19 are retracted to turn the beam mid-section section 15 as before described, the wing sections 16 are turned, and raised, correspondingly, and are then supported at their distal ends by wheels 24, the axes of which are perpendicular to the wing sections and so off-set that the wing sections 16 remain aligned with the mid-section 15, the wheels 22 being lifted clear of the ground, as shown in FIGS. 6, 7 and 8.

Each of the sections 15 and 16 of the beam 14 carries a flexible soil working assembly 25, each consisting mainly of a section 26 of heavy chain with barred links, commonly called "anchor chain", each link having opposed angled blades 27 welded to and extending outwardly from both its sides. Each chain section 26 is mounted substantially parallel to and behind a section of the beam, that of each beam wing section 16 being tensioned between a pair of wing carrier frames 28, that of the beam mid-section being tensioned between a pair of central carrier frames 29. The carrier frames 28 and 29 are all pivoted to the relevant beam sections and are such that, as shown particularly in FIG. 1, when the three beam sections are aligned, the pivots of all carrier frames are coaxial, and the central soil working assembly 25 is behind, and in overlapping arrangement with, the two wing assemblies 25, so that the working front of the three assemblies is unbroken. Each chain section 26 is connected at its ends to its carrier frames for rotation as well as for a degree of pivotal movement relative to the carrier frames.

The downward pivotal movement of each carrier frame 28 or 29 relative to the beam section on which it is mounted is restricted by a limit chain 30 connected adjustably between a limit bracket 31 fixed to the beam section and the carrier frame.

As the implement is drawn across the ground the blades 27 of the heavy chain sections 26 are driven gravitationally into the earth, and the soil working assemblies 25 are caused to rotate. Each blade 27, as its chain link turns, scoops out a hollow in the soil. The blades also have the effect of forcing trash mulch overlying the ground into the soil.

The multiplicity of hollows formed in the soil are not such that they will make the ground difficult to drive across, but they will be found to be very effective in collecting and holding rain water so that it will be slowly absorbed into the soil rather than run off the surface. The implement will therefore be found to be efficient in preventing or very materially reducing soil erosion due to rain run-off, and it will also greatly assist in the reduction of wind erosion of the soil.

When the implement is to be moved without working the soil, the cables 23 are released from their connections to the beam wings 16. The implement is then towed forward so that the beam wing sections are drawn hingedly around to trailing positions, as shown in FIG. 7, riding on the wheels 24.

When the implement has been drawn to the area where the soil is to be worked, it is backed until the beam wing sections 16, riding on the wheels 24, are swung outwardly more or less in alignment with the retracting beam mid section 15. The cables 23 are reconnected to the wing sections, and the rams 19 are extended to swing the beam back and down, bringing the wheels 24 down into place to support the wing sections, the wheels 22 being lifted clear of the ground. At the same time, the carrier frames 28 and 29 lower the soil working assemblies 25 to the ground, for operation as the implement is drawn forward.

Figure 9:
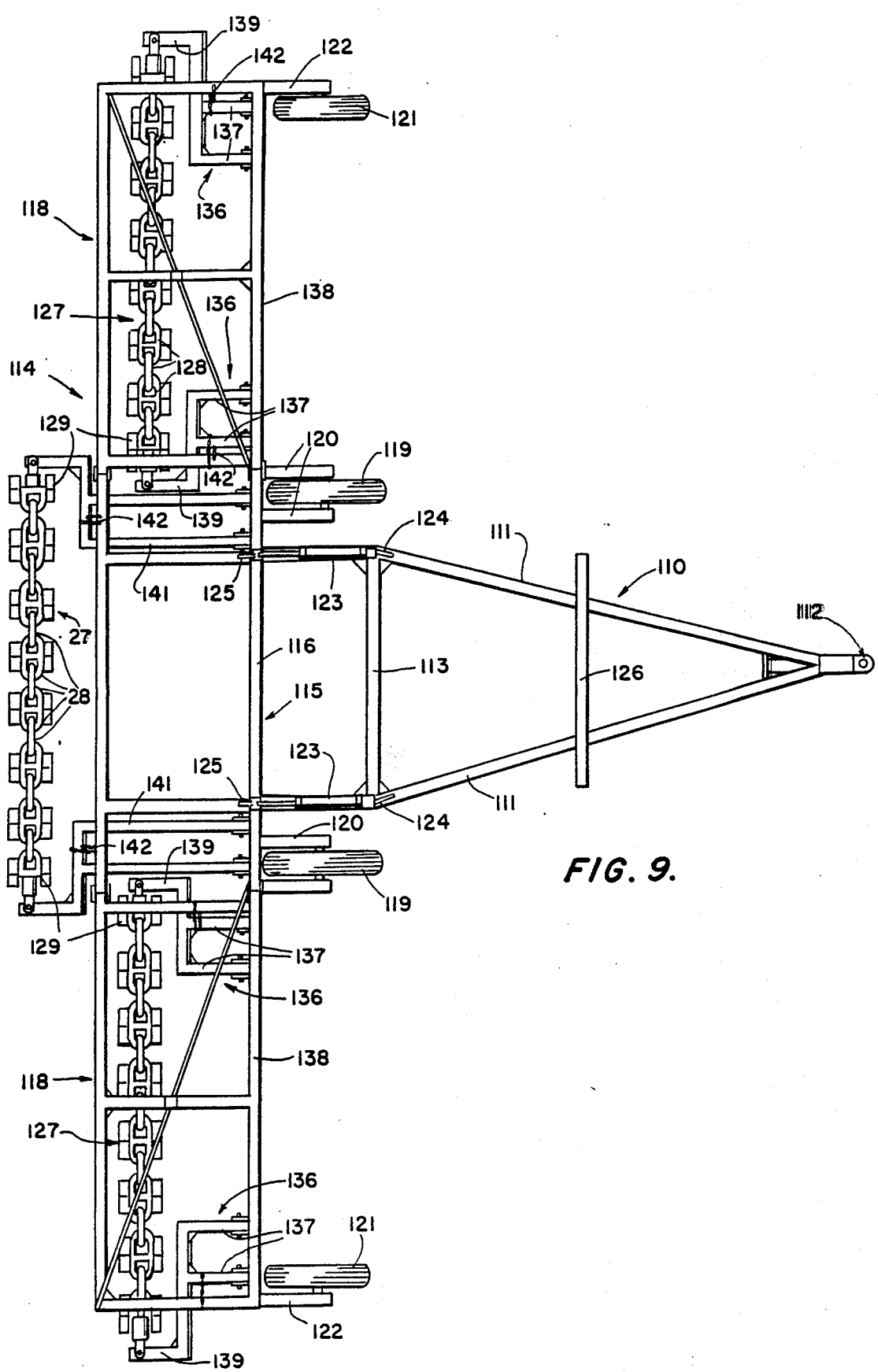
FIG. 9 is a plan view of an implement of a second embodiment according to the invention.
Figure 10:
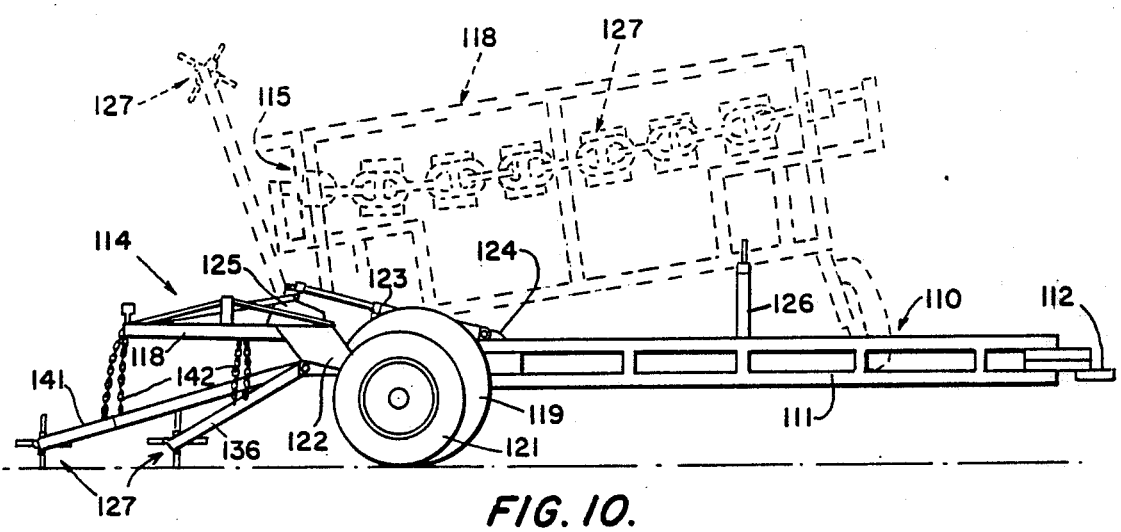
FIG. 10 is a side elevational view of the implement.
Figure 11:
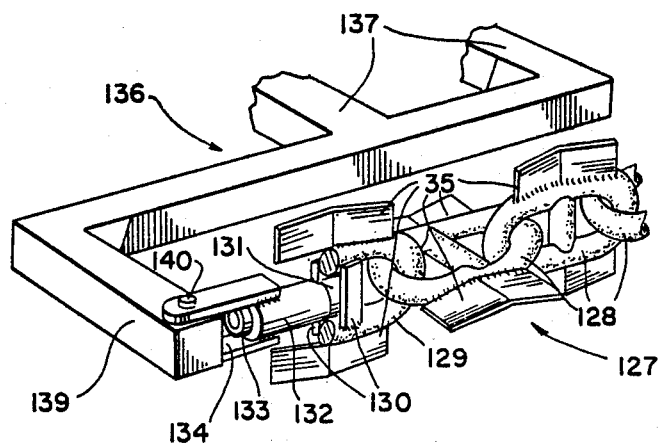
FIG. 11 is a perspective view of part of the flexible soil working assembly of the implement.

Referring now to FIGS. 9 to 11, the implement illustrated includes a drawbar 110 with sides frames 111 rearwardly divergent from a front hitch 112 for connection to a tractor or tractor-drawn chisel plough or other implement. The said frames 111 are rigidly interconnected by a cross-member 113, behind which the side frames extend in parallel relationship.

At their rear ends the drawbar side frames 111 are connected to a transverse mounting frame 114. This mounting frame consists of a rectangular central section 115, of which the front member 116 is hingedly connected about a transverse axis to the rear ends of the drawbar side frames 111, and two rectangular wing frames 118 aligned with, and hingedly connected to the sides of, the central section 118.

The central section 115 is supported by a pair of inner wheels 119, each carried between a pair of wheel mounting brackets 120 fixed to, and inclining downwardly and forwardly from, the central section's front member 116. Each of the wing frames 118 is supported at its outer side by an outer wheel 121 carried by a forwardly and downwardly inclining wheel mounting bracket 122.

The hinged transverse mounting frame 114 is normally maintained more or less horizontal by a pair of hydraulic rams 123 connected between brackets 124 on the drawbar side frames 111 and brackets 125 on the central section 115 of the mounting frame 114. By retraction of the rams 123, the mounting frame 113 may be raised hingedly relative to the drawbar 110, remaining supported by the inner wheels 119; and the two wing frames 118 may then be swung pivotally forwards, as indicated in broken outline in FIG. 10, to rest upon a support frame 126 upon drawbar 10.

Each of the central section 115 and two wing frames 118 of the mounting frame 114 carries a flexible soil working assembly consisting mainly of a length of heavy chain with barred links 128, and of the type commonly called "anchor chain". The chain terminates at each end in a modified or end link 129 which is of U-shape having a pair of plates 130 welded across its arms. An axle 131, having one end welded or otherwise fixed between the plates 130, is rotatable in a bearing 132 and is restrained from leaving it by a collar 133 on its other end. Two parallel pivot plates 134 are welded to and extend from the bearing 132. A pair of blades 135 are welded to opposite sides of each of the links 128 and the end links 129 to extend in opposite directions from the link. Each of the blades is formed with an obtuse-angle bend at its middle.

The flexible soil working assembly 127 of each of the wing frames 118 is carried between a pair of carrier brackets 136. Each of these carrier brackets has two forwardly extending arms 137 coaxially pivoted under the front member 138 of the wing frame, and a rearwardly extending arm 139 to the rear extremity of which the pivot plates 134 at an end of the assembly 127 are connected by a pivot bolt 140.

In generally similar manner the flexible soil working assembly 127 of the central section 115 is mounted between a pair of carrier brackets 141 having their front ends pivoted under the front member 116 of the central section about a common transverse axis. The carrier brackets 141 of the central section are of greater length then, but otherwise similar to, the carrier brackets 136 of the wing frames, so that the central soil working assembly 127 is located behind and between those of the wing frames, the three assemblies being arranged so that their working front is unbroken.

As the implement is drawn across the ground the blades 135 of the heavy chain links 128 and 129 are driven gravitationally into the soil, and the soil working assemblies are caused to rotate. Each blade, as its chain link turns, scoops out a hollow in the soil. The blades also have the effect of forcing trash mulch, which overlies the ground, into the soil. The multiplicity of hollows formed in the soil are not such that they will make the ground difficult to drive across, but at the same time these hollows will be found to be very effective in collecting and holding rain water so that it will be slowly absorbed into the soil rather than run off the surface. The implement will therefore be found to be efficient in preventing or very materially reducing soil erosion due to rain run-off, and it will also greatly assist in the reduction of wind erosion of the soil.

When the implement is to be moved without working the soil, the hydraulic rams 123 are operated to lift the mounting frame 114 hingedly. Light suspension chains 142 are connected between the carrier brackets 136 or 141 of each of the soil working assemblies 127 and the rear of the section of the mounting frame 114 on which it is carried. When the mounting frame is hingedly raised, then the soil working assemblies will also be lifted well clear of the ground. The mounting frame 114 will also be raised further from the ground as the inner wheels 119 are brought back under the central section 115. The wing frames may then be swung forwards to the position indicated in FIG. 10 and supported on the support frame 126.

Implements according to the invention will be found to be very effective in achieving the objects for which they have been devised. Various modifications may be made in the implement described and illustrated; for example the blades 25, 135 may be curved or straight rather than angled, and they may, instead of being welded to the links, be bolted to lugs welded on the links, for easy replacement in the event of undue wear.

I claim:

1. An agricultural implement for soil erosion control, of the type having a mobile mounting frame capable of being moved across an area to be treated, and a soil working assembly connected to carrier means to the mounting frame transversely of the direction of travel, wherein the soil working assembly comprises:
   a flexible chain of interconnected links connected at its opposite ends to the carrier means for rotation of the chain about its axis, the axis of the chain being transverse to the direction of travel; and
   a pair of blades fixed to and extending in opposite directions from opposite sides of each link, said blades being adapted to penetrate gravitationally and scoop hollows from the soil as the implement is advanced, rotating the chain over the soil.

2. An agricultural implement according to claim 1 wherein:
   the mounting frame comprises a central section flanked by a pair of wing frames hingedly connected to the sides of the central section; and
   three of the said soil working assemblies are provided, connected by carrier means to the central section and each of the wing frames, respectively.

3. An agricultural implement according to claim 2 wherein:
   the soil working assemblies of the wing frames are axially aligned with each other in advance of and in overlapping arrangement with the soil working assembly of the central section.

4. An agricultural implement according to claim 1 wherein the carrier means include:
   a pair of carrier brackets hinged at their front to, and trailing from, the mounting frame; and
   bearings pivoted to the rear ends of the carrier brackets to rotatably receive axles secured to and extending from the ends of a soil working assembly.

5. An agricultural implement according to claim 4 wherein:
   the mounting frame is wheel-mounted and hingedly connected to the rear of a drawbar connectible to a towing vehicle;
   lifting means are provided for moving the mounting frame from a substantially horizontal working position to an upright travelling position; and
   suspension means are provided for limiting downward movement of the soil working assembly relative to the mounting frame.

6. An agricultural implement according to claim 5, wherein:
   the wing sections are pivotally mounted to the central section for swinging movement forwardly of the central section when the mounting frame is moved to its upright travelling position.

7. An agricultural implement according to claim 1 wherein:
   the wheel mounting means for each wing section include:
   a first wheel for supporting the wing section when the implement is advanced with the mounting frame sections in alignment; and
   a second wheel, its axis perpendicular to that of the first wheel, for supporting the wing section when rotated and raised and trailed behind the central section.

8. An agricultural implement for soil erosion control of the type having a mobile mounting frame adapted to be moved across an area to be treated, and comprising a central section flanked by a pair of wing sections connected to the sides of the central section and with wheel mounting means at their outer ends, a soil working assembly being connected by carrier means to each mounting frame section, wherein:
   each soil working assembly comprises a flexible chain of interconnected links connected at its opposite ends to the carrier means for rotation about the longitudinal axis of the chain, the axis of the chain being transverse to the direction of travel;
   a pair of blades fixed to and extending in opposite directions from opposite sides of the middle of each link, said blades being adapted to penetrate gravitationally and scoop hollows from the soil as the implement is advanced, rotating the chain over the soil;
   said wing sections of the mounting frame being connected by universal joints to the central section and each being wheel-mounted at its outer end;
   staying means releasably holding the three mounting frame sections in lateral alignment;
   actuating means connected with the frame sections for rotating about a transverse axis and simultaneously lifting the interconnected mounting frame sections, causing the carrier means to lift the soil work assemblies clear of the ground; and
   the wing sections, when the mounting frame sections have been rotated and lifted, the staying means have been released and the implement is advanced, being trailed behind the sides of the central section.

* * * * *